United States Patent
Trowbridge

(10) Patent No.: US 10,576,311 B2
(45) Date of Patent: Mar. 3, 2020

(54) REMOTELY CONTROLLED AIR SUPPLY ASSEMBLY

(71) Applicant: Mathew Trowbridge, Liverpool, NY (US)

(72) Inventor: Mathew Trowbridge, Liverpool, NY (US)

(*) Notice: Subject to any disclaimer, the term of this patent is extended or adjusted under 35 U.S.C. 154(b) by 282 days.

(21) Appl. No.: 15/652,489

(22) Filed: Jul. 18, 2017

(65) Prior Publication Data

US 2019/0022432 A1 Jan. 24, 2019

(51) Int. Cl.
| | |
|---|---|
| A62B 7/00 | (2006.01) |
| A62B 9/00 | (2006.01) |
| A62B 9/02 | (2006.01) |
| G09B 9/00 | (2006.01) |
| G09B 19/24 | (2006.01) |
| B63C 11/32 | (2006.01) |
| B63C 11/22 | (2006.01) |
| F16K 31/02 | (2006.01) |
| A62B 7/02 | (2006.01) |
| A62B 27/00 | (2006.01) |

(52) U.S. Cl.
CPC ............... *A62B 9/006* (2013.01); *A62B 9/02* (2013.01); *B63C 11/32* (2013.01); *G09B 9/00* (2013.01); *G09B 19/24* (2013.01); *A62B 7/00* (2013.01); *A62B 7/02* (2013.01); *A62B 27/00* (2013.01); *B63C 11/22* (2013.01); *F16K 31/02* (2013.01)

(58) Field of Classification Search
CPC .. A62B 9/006; A62B 9/02; A62B 7/00; A62B 7/02; A62B 27/00; A62B 27/02; A62B 27/04; G09B 9/00; G09B 19/24; B63C 11/22; F16K 31/02
See application file for complete search history.

(56) References Cited

U.S. PATENT DOCUMENTS

| | | | |
|---|---|---|---|
| 5,808,182 | A | 9/1998 | Stumpf |
| 6,514,080 | B2 | 2/2003 | Ishida |
| 7,448,378 | B2 | 11/2008 | Hirose |
| 8,556,633 | B2 | 10/2013 | Aaberg |
| D732,642 | S | 6/2015 | Morgan et al. |
| 9,151,716 | B1 | 10/2015 | Laughlin |
| 2004/0086838 | A1 | 5/2004 | Dinis |
| 2008/0198026 | A1 | 8/2008 | Hatton-Downward |
| 2014/0246025 | A1* | 9/2014 | Cragg ............... A61M 16/208 128/204.19 |

FOREIGN PATENT DOCUMENTS

WO    WO20161962897    10/2016

* cited by examiner

*Primary Examiner* — Timothy A Musselman

(57) ABSTRACT

A remotely controlled air supply assembly for simulating emergency situations includes a self-contained breathing apparatus, such as used by firemen and scuba divers. At least one governor is configured to fluidically couple to and position in-line with tubing of the self-contained breathing apparatus. The at least one governor is configured to modify airflow through the tubing. The at least one governor is configured to communicate wirelessly. A controller is wirelessly coupled to the at least one governor. The controller is positioned to communicate at least one command to the at least one governor to compel the at least one governor to modify the airflow through the tubing to simulate an emergency situation.

12 Claims, 3 Drawing Sheets

REMOTELY CONTROLLED AIR SUPPLY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to air supply assemblies and more particularly pertains to a new air supply assembly for simulating emergency situations.

BRIEF SUMMARY OF THE INVENTION

An embodiment of the disclosure meets the needs presented above by generally comprising a self-contained breathing apparatus, such as used by firemen and scuba divers. At least one governor is configured to fluidically couple to and position in-line with tubing of the self-contained breathing apparatus. The at least one governor is configured to modify airflow through the tubing. The at least one governor is configured to communicate wirelessly. A controller is wirelessly coupled to the at least one governor. The controller is positioned to communicate at least one command to the at least one governor to compel the at least one governor to modify the airflow through the tubing to simulate an emergency situation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
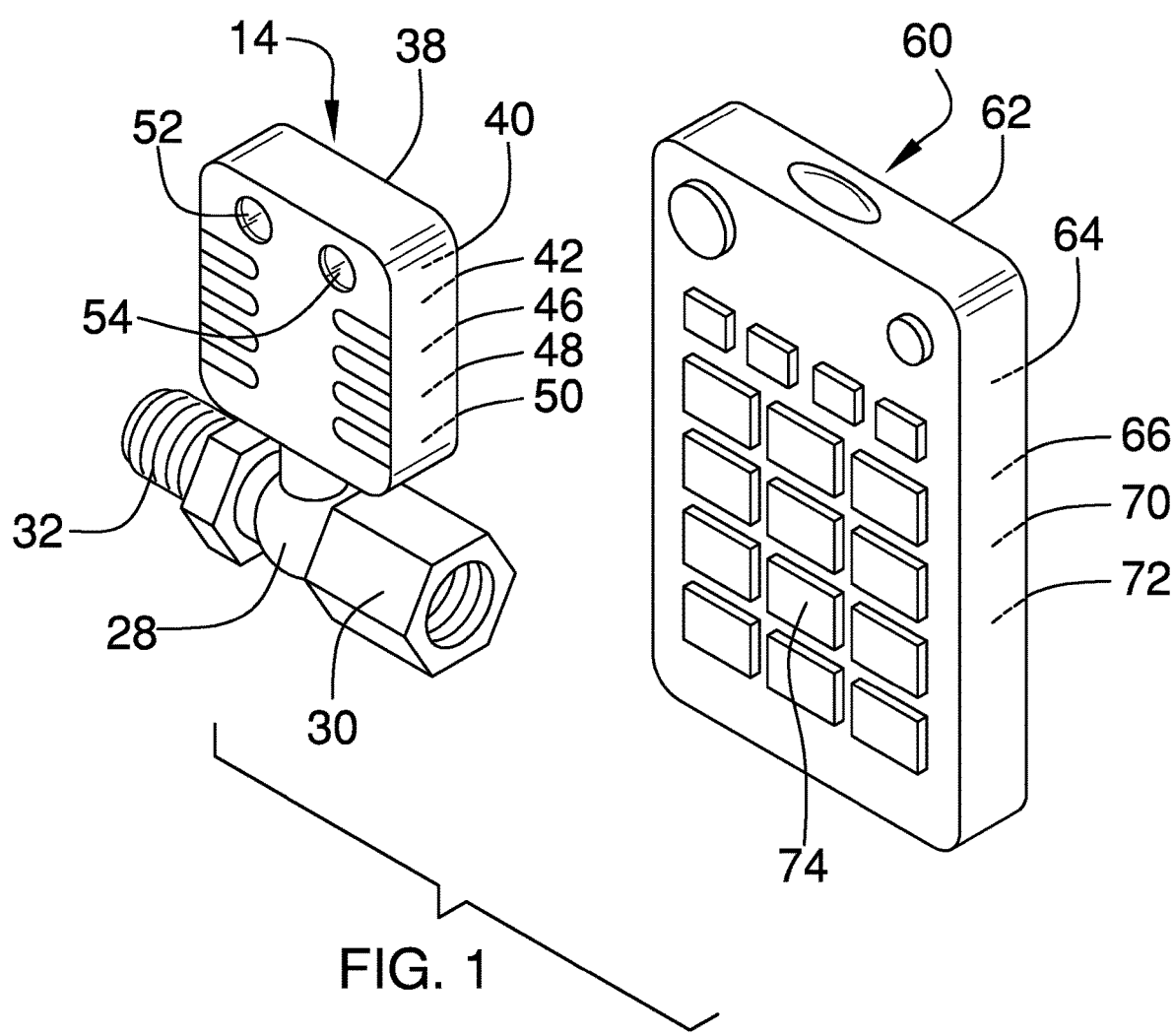
FIG. 1 is an isometric perspective view of a remotely controlled air supply assembly according to an embodiment of the disclosure.
Figure 2:
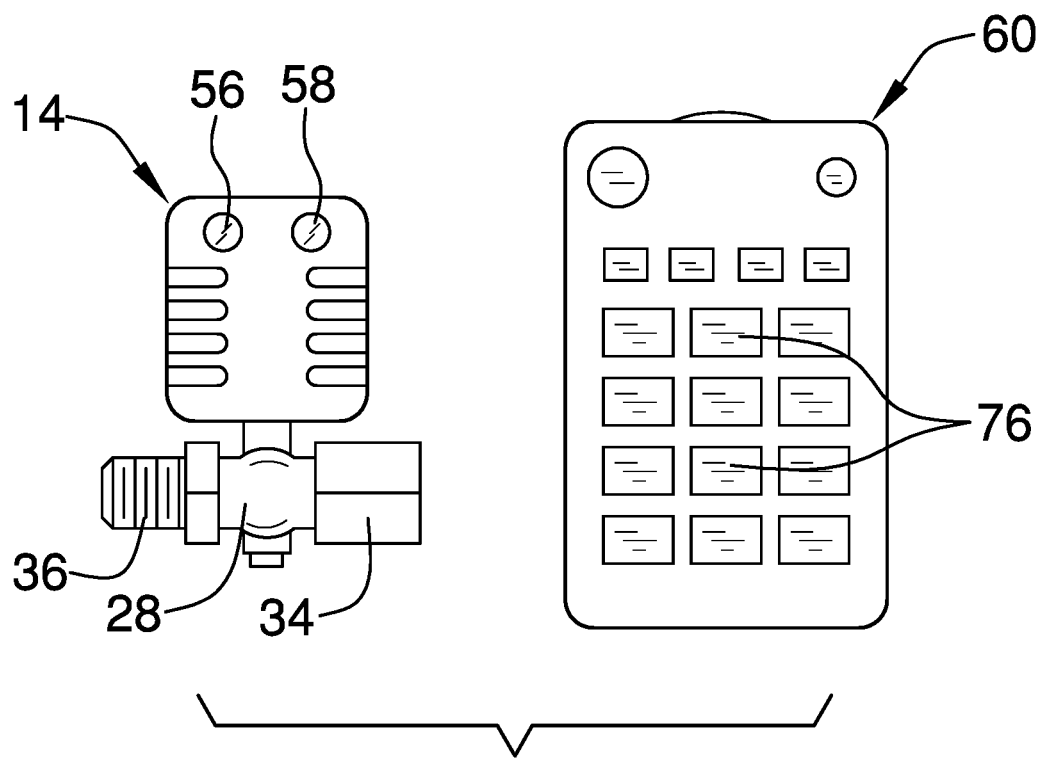
FIG. 2 is a front view of an embodiment of the disclosure.
Figure 3:
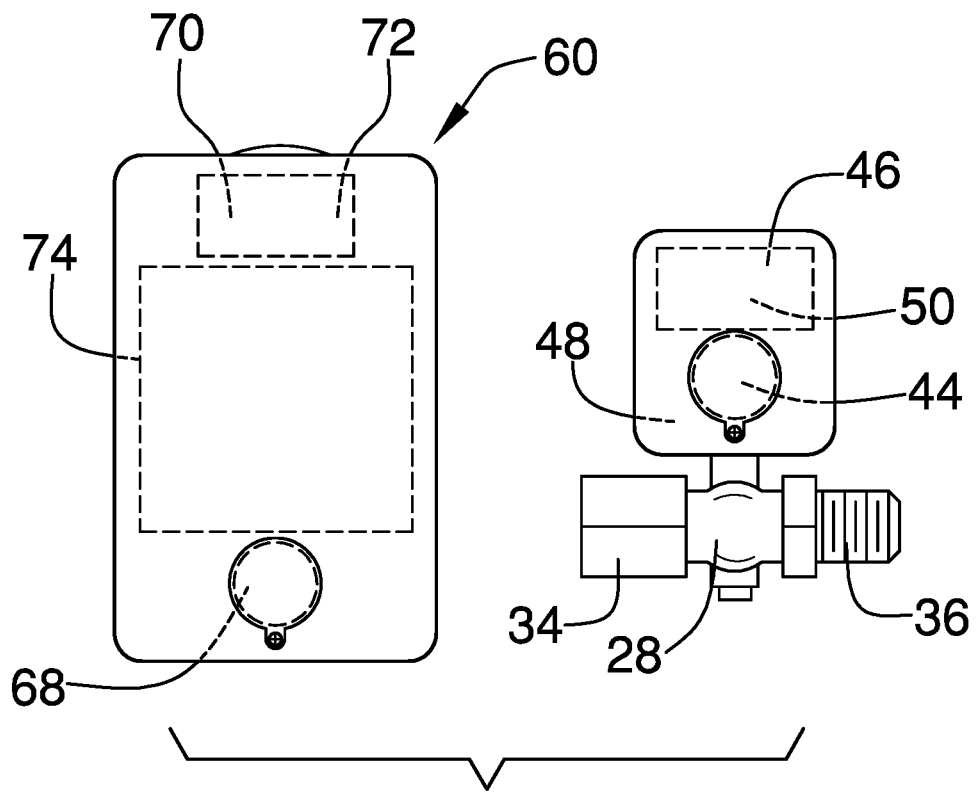
FIG. 3 is a rear view of an embodiment of the disclosure.
Figure 4:
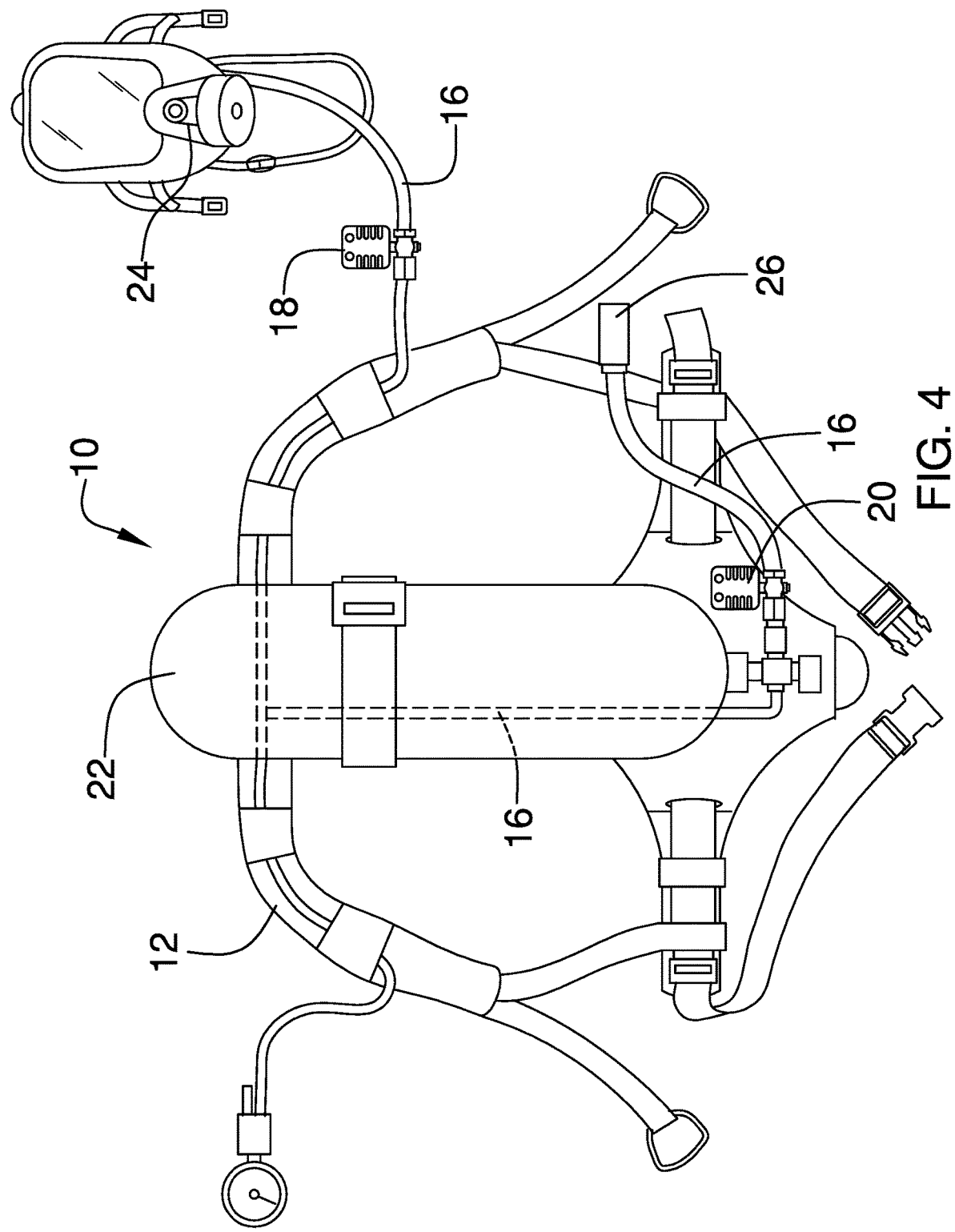
FIG. 4 is an in-use view of an embodiment of the disclosure.

With reference now to the drawings, and in particular to FIGS. 1 through 4 thereof, a new air supply assembly embodying the principles and concepts of an embodiment of the disclosure and generally designated by the reference numeral 10 will be described.

As best illustrated in FIGS. 1 through 4, the remotely controlled air supply assembly 10 generally comprises a self-contained breathing apparatus 12, such as used by firemen and scuba divers. At least one governor 14 is configured to fluidically couple to and position in-line with tubing 16 of the self-contained breathing apparatus 12. The at least one governor 14 is configured to modify airflow through the tubing 16. The at least one governor 14 also is configured to communicate wirelessly.

In one embodiment, the at least one governor 14 comprises a first governor 18 and a second governor 20. The first governor 18 is positioned between a tank 22 and a mask-mounted regulator 24 of the self-contained breathing apparatus 12. The second governor 20 is positioned between the tank 22 and a backup regulator 26 of the self-contained breathing apparatus 12.

The at least one governor 14 comprises a valve 28 that is fluidically coupled to and is positioned in-line with the tubing 16. A first coupler 30 and a second coupler 32 are coupled to the valve 28. The first coupler 30 and the second coupler 32 are configured to fluidically couple the valve 28 to the tubing 16. In one embodiment, the first coupler 30 comprises a female hose connector 34 and the second coupler 32 comprises a male hose connector 36.

A first housing 38 that defines an internal space 40 is coupled to and extends from the valve 28. In one embodiment, the first housing 38 is substantially rectangularly box shaped. A first power module 42 is coupled to the first housing 38 and is positioned in the internal space 40. In another embodiment, the first power module 42 comprises at least one first battery 44.

A first microprocessor 46, an actuator 48, and a first transceiver 50 are coupled to the first housing 38 and are positioned in the internal space 40. The first microprocessor 46 is operationally coupled to the first power module 42. The actuator 48 is operationally coupled to the first microprocessor 46 and to the valve 28. The first transceiver 50 is operationally coupled to the first microprocessor 46. The first transceiver 50 is positioned to receive at least one command and to relay the at least one command to the first microprocessor 46. The first microprocessor 46 is positioned to compel the actuator 48 to compel the valve 28 to modify the airflow through the tubing 16.

In one embodiment, a first indicator 52 and a second indicator 54 are coupled to the first housing 38. The first indicator 52 and the second indicator 54 are operationally coupled to the first microprocessor 46. The first microprocessor 46 is positioned to compel the first indicator 52 to notify a user to an emergency situation. The first microprocessor 46 is positioned to compel the second indicator 54 to notify the user to standard conditions. In another embodiment, the first indicator 52 comprises a red light emitting diode 56 and the second indicator 54 comprises a green light emitting diode 58.

A controller 60 is wirelessly coupled to the at least one governor 14. The controller 60 is positioned to communicate the at least one command to the at least one governor 14 to compel the at least one governor 14 to modify the airflow through the tubing 16 to simulate the emergency situation.

The controller 60 comprises a second housing 62 that defines an interior space 64. In one embodiment, the second housing 62 is substantially rectangularly box shaped. A second power module 66 is coupled to the second housing 62 and is positioned in the interior space 64. In another embodiment, the second power module 66 comprises at least one second battery 68.

A second microprocessor 70 and a second transceiver 72 are coupled to the second housing 62 and are positioned in the interior space 64. The second microprocessor 70 is operationally coupled to the second power module 66. The second transceiver 72 is operationally coupled to the second microprocessor 70. A control panel 74 is coupled to the second housing 62. The control panel 74 is operationally coupled to the second microprocessor 70. The control panel 74 is configured to enter the at least one command into the second microprocessor 70. The second transceiver 72 is positioned to receive the at least one command from the second microprocessor 70 and to relay the at least one command to the first transceiver 50. The first transceiver 50 is positioned to relay the at least one command to the first microprocessor 46. The first microprocessor 46 is positioned to compel the actuator 48 to compel the valve 28 to modify the airflow through the tubing 16 to simulate the emergency situation.

In one embodiment, the control panel 74 comprises a plurality of buttons 76. Each button 76 is configured to be depressed to enter an instruction for a respective emergency situation into the second microprocessor 70. The plurality of buttons 76 has a variety of instructions for a variety emergency situations.

In use, the control panel 74 is positioned on the second housing 62 so that each button 76 is configured to be depressed to enter an instruction for the respective emergency situation into the second microprocessor 70. The second microprocessor 70 is positioned to compel the second transceiver 72 to relay the at least one command to the first transceiver 50. The first transceiver 50 is positioned to relay the at least one command to the first microprocessor 46. The first microprocessor 46 is positioned to compel the actuator 48 to compel the valve 28 to modify the airflow through the tubing 16 to simulate the respective emergency situation. The first microprocessor 46 is positioned to compel the first indicator 52 to notify the user to the emergency situation and to compel the second indicator 54 to notify the user to the standard conditions.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remotely controlled air supply assembly comprising:
    a self-contained breathing apparatus, such as used by firemen and scuba divers;
    at least one governor configured for fluidically coupling to and positioning in-line with tubing of said self-contained breathing apparatus, said at least one governor being configured for modifying airflow through said tubing, said at least one governor being configured for wireless communication;
    a controller wirelessly coupled to said at least one governor;
    wherein said controller is wirelessly coupled to said at least one governor such that said controller is positioned for communicating at least one command to said at least one governor for compelling said at least one governor for modifying the airflow through said tubing for simulating an emergency situation; and
    said at least one governor comprising a first governor and a second governor, said first governor being positioned between a tank and a mask-mounted regulator of said self-contained breathing apparatus, said second governor being positioned between said tank and a backup regulator of said self-contained breathing apparatus.

2. A remotely controlled air supply assembly comprising:
    a self-contained breathing apparatus, such as used by firemen and scuba divers;
    at least one governor configured for fluidically coupling to and positioning in-line with tubing of said self-contained breathing apparatus, said at least one governor being configured for modifying airflow through said tubing, said at least one governor being configured for wireless communication;
    a controller wirelessly coupled to said at least one governor;
    wherein said controller is wirelessly coupled to said at least one governor such that said controller is positioned for communicating at least one command to said at least one governor for compelling said at least one governor for modifying the airflow through said tubing for simulating an emergency situation; and
    said at least one governor comprising
        a valve fluidically coupled to and positioned in-line with said tubing;

a first housing defining an internal space, said first housing being coupled to and extending from said valve;

a first power module coupled to said first housing and positioned in said internal space;

a first microprocessor coupled to said first housing and positioned in said internal space, said first microprocessor being operationally coupled to said first power module;

an actuator coupled to said first housing and positioned in said internal space, said actuator being operationally coupled to said first microprocessor and said valve;

a first transceiver coupled to said first housing and positioned in said internal space, said first transceiver being operationally coupled to said first microprocessor; and wherein said first transceiver is positioned in said first housing such that said first transceiver is positioned for receiving at least one command and for relaying the at least one command to said first microprocessor, such that said first microprocessor is positioned for compelling said actuator for compelling said valve for modifying the airflow through said tubing.

3. The assembly of claim 2, further including said first housing being substantially rectangularly box shaped.

4. The assembly of claim 2, further including said first power module comprising at least one first battery.

5. The assembly of claim 2, further comprising:

a first coupler coupled to said valve, said first coupler being configured for fluidically coupling said valve to said tubing, said first coupler comprising a female hose connector; and a second coupler coupled to said valve, said second coupler being configured for fluidically coupling said valve to said tubing, said second coupler comprising a male hose connector.

6. The assembly of claim 2, further comprising:

a first indicator coupled to said first housing, said first indicator being operationally coupled to said first microprocessor;

a second indicator coupled to said first housing, said second indicator being operationally coupled to said first microprocessor; and wherein said first indicator and said second indicator are positioned on said first housing such that said first microprocessor is positioned for compelling said first indicator for notifying a user to the emergency situation and for compelling said second indicator for notifying the user to standard conditions.

7. The assembly of claim 6, further including said first indicator comprising a red light emitting diode, said second indicator comprising a green light emitting diode.

8. The assembly of claim 2, further including said controller comprising:

a second housing defining an interior space;

a second power module coupled to said second housing and positioned in said interior space;

a second microprocessor coupled to said second housing and positioned in said interior space, said second microprocessor being operationally coupled to said second power module;

a control panel coupled to said second housing, said control panel being operationally coupled to said second microprocessor such that said control panel is configured for entering the at least one command into said second microprocessor;

a second transceiver coupled to said second housing and positioned in said interior space, said second transceiver being operationally coupled to said second microprocessor; and wherein said second transceiver is positioned in said second housing such that said second transceiver is positioned for receiving the at least one command from said second microprocessor and for relaying the at least one command to said first transceiver, such that said first transceiver is positioned for relaying the at least one command to said first microprocessor, such that said first microprocessor is positioned for compelling said actuator for compelling said valve for modifying the airflow through said tubing for simulating the emergency situation.

9. The assembly of claim 8, further including said second housing being substantially rectangularly box shaped.

10. The assembly of claim 8, further including said second power module comprising at least one second battery.

11. The assembly of claim 8, further including said control panel comprising a plurality of buttons, each said button being configured for depressing for entering an instruction for a respective emergency situation into said second microprocessor such that said plurality of buttons has a variety of instructions for a variety emergency situations.

12. A remotely controlled air supply assembly comprising:

a self-contained breathing apparatus, such as used by firemen and scuba divers;

at least one governor configured for fluidically coupling to and positioning in-line with tubing of said self-contained breathing apparatus, said at least one governor being configured for modifying airflow through said tubing, said at least one governor being configured for wireless communication, said at least one governor comprising a first governor and a second governor, said first governor being positioned between a tank and a mask-mounted regulator of said self-contained breathing apparatus, said second governor being positioned between said tank and a backup regulator of said self-contained breathing apparatus, said at least one governor comprising:

a valve fluidically coupled to and positioned in-line with said tubing, a first coupler coupled to said valve, said first coupler being configured for fluidically coupling said valve to said tubing, said first coupler comprising a female hose connector, a second coupler coupled to said valve, said second coupler being configured for fluidically coupling said valve to said tubing, said second coupler comprising a male hose connector, a first housing defining an internal space, said first housing being coupled to and extending from said valve, said first housing being substantially rectangularly box shaped, a first power module coupled to said first housing and positioned in said internal space, said first power module comprising at least one first battery, a first microprocessor coupled to said first housing and positioned in said internal space, said first microprocessor being operationally coupled to said first power module, an actuator coupled to said first housing and positioned in said internal space, said actuator being operationally coupled to said first microprocessor and said valve, a first transceiver coupled to said first housing and positioned in said internal space, said first transceiver being operationally coupled to said first microprocessor, wherein said first transceiver is positioned in said first housing such that said first transceiver is positioned for receiving at least one command and for relaying the at least one command to said first microprocessor, such that said first microprocessor is positioned for compelling said actuator for compelling said valve for modifying the airflow through said tubing, a first indicator coupled to said first housing, said first indicator being operationally coupled to said first microprocessor, wherein said first indicator is positioned on said first housing such that said first microprocessor is positioned for compelling said first indicator for notifying a user to an emergency situation, said first indicator comprising a red light emitting diode, and a second indicator coupled to said first housing, said second indicator being operationally coupled to said first microprocessor, wherein said second indicator is positioned on said first housing such that said first microprocessor is positioned for compelling said second indicator for notifying the user to standard conditions, said second indicator comprising a green light emitting diode;

a controller wirelessly coupled to said at least one governor, wherein said controller is wirelessly coupled to said at least one governor such that said controller is positioned for communicating the at least one command to said at least one governor for compelling said at least one governor for modifying the airflow through said tubing for simulating the emergency situation, said controller comprising:

a second housing defining an interior space, said second housing being substantially rectangularly box shaped, a second power module coupled to said second housing and positioned in said interior space, said second power module comprising at least one second battery, a second microprocessor coupled to said second housing and positioned in said interior space, said second microprocessor being operationally coupled to said second power module, a control panel coupled to said second housing, said control panel being operationally coupled to said second microprocessor such that said control panel is configured for entering the at least one command into said second microprocessor, said control panel comprising a plurality of buttons, each said button being configured for depressing for entering an instruction for a respective emergency situation into said second microprocessor such that said plurality of buttons has a variety of instructions for a variety of emergency situations, and a second transceiver coupled to said second housing and positioned in said interior space, said second transceiver being operationally coupled to said second microprocessor, wherein said second transceiver is positioned in said second housing such that said second transceiver is positioned for receiving the at least one command from said second microprocessor and for relaying the at least one command to said first transceiver, such that said first transceiver is positioned for relaying the at least one command to said first microprocessor, such that said first microprocessor is positioned for compelling said actuator for compelling said valve for modifying the airflow through said tubing for simulating the respective emergency situation; and wherein said control panel is positioned on said second housing such that each said button is configured for depressing for entering an instruction for the respective emergency situation into said second microprocessor, wherein said second microprocessor is positioned for compelling said second transceiver for relaying the at least one command to said first transceiver, such that said first transceiver is positioned for relaying the at least one command to said first microprocessor, wherein said first microprocessor is positioned for compelling said actuator for compelling said valve for modifying the airflow through said tubing for simulating the respective emergency situation, wherein said first indicator and said second indicator are positioned on said first housing such that said first microprocessor is positioned for compelling said first indicator for notifying the user to the emergency situation and for compelling said second indicator for notifying the user to the standard conditions.

* * * * *